(12) United States Patent
Kim

(10) Patent No.: US 12,053,961 B1
(45) Date of Patent: Aug. 6, 2024

(54) EASILY CONSTRUCTED STONE CHIP-PREVENTING PROTECTION FILM ATTACHABLE TO OUTSIDE OF AUTOMOBILE WINDSHIELD

(71) Applicant: INTERCONIX CO., LTD, Pocheon-si (KR)

(72) Inventor: Kwang Won Kim, Incheon (KR)

(73) Assignee: INTERCONIX CO., LTD, Pocheon-si (KR)

( * ) Notice: Subject to any disclaimer, the term of this patent is extended or adjusted under 35 U.S.C. 154(b) by 0 days.

(21) Appl. No.: 18/562,146

(22) PCT Filed: Apr. 27, 2022

(86) PCT No.: PCT/KR2022/006030
§ 371 (c)(1),
(2) Date: Feb. 28, 2024

(87) PCT Pub. No.: WO2022/245006
PCT Pub. Date: Nov. 24, 2022

(30) Foreign Application Priority Data

May 18, 2021 (KR) .................. 10-2021-0063914
Jul. 22, 2021 (KR) .................. 10-2021-0096579

(51) Int. Cl.
*B32B 27/08* (2006.01)
*B32B 7/06* (2019.01)
(Continued)

(52) U.S. Cl.
CPC .............. *B32B 27/08* (2013.01); *B32B 7/06* (2013.01); *B32B 27/18* (2013.01); *B32B 27/36* (2013.01);
(Continued)

(58) Field of Classification Search
CPC ..... B32B 27/08; B32B 27/283; B32B 27/308; B32B 27/36; B32B 27/40; B60J 1/001; B60J 1/2094; B60J 11/00; B60J 11/08
See application file for complete search history.

(56) References Cited

U.S. PATENT DOCUMENTS

2022/0024194 A1* 1/2022 Lee .................. C09D 175/04
2022/0072831 A1* 3/2022 Lee ...................... B60J 1/001

FOREIGN PATENT DOCUMENTS

JP 2014218586 A * 11/2014 .......... B32B 17/064
KR 10-1999-0040878 A 6/1999
(Continued)

OTHER PUBLICATIONS

Machine Translation of JP 2014-218586 (Year: 2014).*
(Continued)

*Primary Examiner* — Zachary M Davis
(74) *Attorney, Agent, or Firm* — Sughrue Mion, PLLC

(57) ABSTRACT

The present invention relates to an easily constructed stone chip-preventing protection film attachable to the outside of an automobile windshield.
The easily constructed stone chip-preventing protection film attachable to the outside of an automobile windshield, according to the present invention, comprises: a substrate film layer (100); a surface coating layer (200) disposed on the substrate film layer (100); a protective film layer (300) disposed on the surface coating layer (200); an adhesive layer (400) disposed under the substrate film layer (100); and a release film layer (500) disposed under the adhesive layer (400).
By the construction described above, since the easily constructed stone chip-preventing protection film attachable to the outside of an automobile windshield, according to the present invention, includes a substrate film layer formed of a high elastic film to configure an automobile windshield
(Continued)

protection film, the film can be gently attached and easily constructed without performing a heating process according to the shape of the windshield, so as to enhance the construction efficiency and prevent a stone chip from being caused by an impact of a small stone or a hard foreign substance.

7 Claims, 2 Drawing Sheets

(51) Int. Cl.
    *B32B 27/18*     (2006.01)
    *B32B 27/36*     (2006.01)
    *B32B 27/40*     (2006.01)
    *C09J 7/29*     (2018.01)
    *C09J 7/40*     (2018.01)

(52) U.S. Cl.
    CPC ............. *B32B 27/40* (2013.01); *C09J 7/29* (2018.01); *C09J 7/401* (2018.01); *B32B 2255/10* (2013.01); *B32B 2255/20* (2013.01); *B32B 2255/26* (2013.01); *B32B 2264/1021* (2020.08); *B32B 2270/00* (2013.01); *B32B 2307/30* (2013.01); *B32B 2307/304* (2013.01); *B32B 2307/4026* (2013.01); *B32B 2307/412* (2013.01); *B32B 2307/538* (2013.01); *B32B 2307/54* (2013.01); *B32B 2307/7376* (2023.05); *B32B 2307/748* (2013.01); *B32B 2605/006* (2013.01); *C09J 2203/354* (2020.08); *C09J 2301/162* (2020.08); *C09J 2301/416* (2020.08); *C09J 2400/123* (2013.01); *C09J 2467/005* (2013.01); *C09J 2467/006* (2013.01); *C09J 2475/006* (2013.01); *C09J 2483/005* (2013.01); *C09J 2483/006* (2013.01)

(56) References Cited

FOREIGN PATENT DOCUMENTS

| | | |
|---|---|---|
| KR | 10-2017-0114893 A | 10/2017 |
| KR | 10-1994928 B1 | 10/2019 |
| KR | 10-2021-0002975 A | 1/2021 |
| KR | 10-2021-0022989 A | 3/2021 |
| KR | 10-2381911 B1 | 4/2022 |
| WO | 2016/181739 A1 | 11/2016 |

OTHER PUBLICATIONS

Korean Request for the Submission of an Opinion for 00-2021-0153329, dated Jun. 3, 2022.
Written Decision on Registration for 10-2021-0153329, dated Aug. 26, 2022.
International Search Report of PCT/KR2022/006030 dated Aug. 8, 2022 [PCT/ISA/210].
Written Decision on Registration for KR 10-2021-0096579 dated Mar. 24, 2022.
Request for submission of an opinion for KR 10-2021-0096579 dated Oct. 5, 2021.

\* cited by examiner

EASILY CONSTRUCTED STONE CHIP-PREVENTING PROTECTION FILM ATTACHABLE TO OUTSIDE OF AUTOMOBILE WINDSHIELD

This is a National Stage of PCT/KR2022/006030 filed Apr. 27, 2022, claiming priority based on Korean Patent Application No. 10-2021-0063914 filed May 18, 2021, and Korean Patent Application No. 10-2021-0096579 filed Jul. 22, 2021, the entire disclosures of which are incorporated herein by reference.

TECHNICAL FIELD

The present invention relates to an easily constructed stone chip-preventing protective film attachable to the outside of a windshield of a vehicle, and more particularly to, an easily constructed stone chip-preventing protective film attachable to the outside of a windshield of a vehicle, in which a vehicle windshield protecting film includes a base film layer formed of a highly elastic film, and therefore the protecting film may be smoothly attached and easily constructed without heat construction according to a shape of the windshield of the vehicle, and thus may increase construction efficiency and prevent occurrence of stone chips caused by collision with small stones or hard foreign substances.

BACKGROUND ART

Glass of a vehicle, particularly a windshield, is frequently hit by small stones or hard foreign substances during driving, and scratches and damage that occur on the windshield of the vehicle when small stones or hard foreign substances hit the windshield of the vehicle are referred to as stone chips.

These stone chips cause cracks in the windshield of the vehicle, which gradually increase in size. Thus, leaving the cracks without taking appropriate measures results in the cracks getting bigger over time, in which case the entire windshield of the vehicle should be replaced.

Accordingly, among coating films attached to glass of a vehicle, some coating films attached to an outer surface of the glass of the vehicle, particularly the windshield, to prevent occurrence of the stone chips are proposed. For example, Korean Patent Registration No. 10-1090242, Korean Patent Registration No. 10-1994928, and Korean Patent Registration No. 10-2251137 are disclosed as the related technology for conventional coating films.

Korean Patent Registration No. 10-1090242 relates to a molding processing machine for manufacturing a thermoplastic polyurethane (TPU) film, and a method of manufacturing the TPU film using the same and discloses an extrusion molding processing machine for manufacturing a TPU film, and a method of manufacturing the TPU film using the same, in which a melted solution of a TPU resin is extruded through a "T"-shaped molding block having a linear extrusion slot, a film is temporarily molded, the temporarily molded film is input to a molding part, and then the TPU film completed through molding and cooling is manufactured. Korean Patent Registration No. 10-1090242 has problems in that a shear force is generated on a die surface during extrusion due to high viscosity, flow marks of the melted solution occur, and thus a bending phenomenon occurs, and therefore this invention is difficult to use for protecting the windshield of a vehicle because visual distortion occurs due to the bending phenomenon, and when thin film molding is difficult, a film having a thickness in a range of 100 µm to 200 µm cannot be generally manufactured using a T-die method.

Further, Korean Patent Registration No. 10-1994928 discloses a protective film for a vehicle glass having self-recovery performance, the protective film including a base layer, a urethane coated layer formed on one side of the base layer, a self-recovery layer formed on an upper surface of the urethane coated layer, a protective film layer formed on an upper surface of the self-recovery layer, and an adhesive layer formed on the other surface of the base layer, wherein the base layer is formed to have a thickness in a range of 25 µm to 40 µm and is made of corona or primer-treated polyethylene terephthalate, the urethane coated layer is made of thermoplastic polyurethane having a thickness in a range of 25 µm to 50 µm, and the self-recovery layer is formed to have a thickness in a range of 10 µm to 40 µm and is made of a urethane mixture. Korean Patent Registration No. 10-1994928 has problems in that, since smoothness of polyethylene (PE) and polypropylene (PP) is not excellent, an orange peel phenomenon in which the protective film has a bumpy tangerine peel shape occurs when rolls are laminated, since the protective film may be molded into a curved shape only when heat is applied to polyethylene terephthalate (PET), heating and molding the protective film according to the shape of the windshield takes a long time and construction thereof is difficult, and since there is no release film under the adhesive layer, winding cannot be practically performed.

Further, Korean Patent Registration No. 10-2251137 relates to a method of manufacturing a coating film for attachment to an outer surface of a windshield of a vehicle, wherein a release film, a transparent adhesive layer, a first transparent coating layer, a functional coating layer, and a protective film are arranged in the coating film from the lower side, and the transparent adhesive layer is attached to the outer surface of the windshield of the vehicle, the functional coating layer being formed by a first operation of forming a polymer by mixing and reacting 2-oxepanone, 2-ethyl-2-(hydroxymethyl)-1,3-propanediol, and a solvent, a second operation of preparing a composition by further mixing a curing agent containing 1,6-diisocyanatohexane homopolymer and converting the polymer into a chain-type structure, and a third operation of coating the composition on an upper surface of the first transparent coating layer with gravure or slot die coating and drying the coated composition with hot air, and the solvent is made of propylene glycol monomethyl ether acetate, n-butyl acetate, toluene, xylenes, and ethylbenzene. Korean Patent Registration No. 10-2251137 has problems in that, since the PET may be molded into a curved shape only when the PET is heated, heating and molding the PET according to the shape of the windshield takes a long time, and construction thereof is difficult.

Thus, development of a protective film that may be smoothly attached without heat construction according to the shape of the windshield of the vehicle, may be easily constructed, and thus may increase construction efficiency and prevent occurrence of stone chips caused by collision with small stones or hard foreign substances is required.

Technology corresponding to the background of the present application is disclosed in Korean Patent Registration No. 10-2251137 (registered on May 6, 2021), Korean Patent Registration No. 10-1994928 (registered on Jun. 25, 2019), and Korean Patent Registration No. 10-1090242 (registered on Nov. 30, 2011).

DISCLOSURE

Technical Problem

The present invention is directed to providing an easily constructed stone chip-preventing protective film attachable to the outside of a windshield of a vehicle, in which the protective film of a windshield of a vehicle, which includes a base film layer formed of a highly elastic film, is configured, the protective film may be smoothly attached and easily constructed without heat construction according to a shape of the windshield, thereby increasing construction efficiency, and occurrence of stone chips caused by collision with small stones or hard foreign substances may be prevented.

Various aspects of the present invention are not limited to the aspects described above, and those skilled in the art will clearly understand other aspects that are not described from the following description.

Technical Solution

One aspect of the present invention provides an easily constructed stone chip-preventing protective film attachable to an outside of a windshield of a vehicle, the protective film including a base film layer (100), a surface coated layer (200) positioned on the base film layer (100), a protective film layer (300) positioned on the surface coated layer (200), an adhesive layer (400) positioned under the base film layer (100), and a release film layer (500) positioned under the adhesive layer (400).

In the base film layer (100), a mixture may be manufactured by mixing 5 to 50 parts by weight of a polyurethane acrylate oligomer, 1 to 30 parts by weight of an acrylic monomer, 30 to 90 parts by weight of an ultraviolet non-reactive resin, and 0.1 to 5 parts by weight of a photoinitiator, a syrup having a viscosity in a range of 300 CPS to 2,000 CPS may be prepared by performing a primary polymerization reaction by irradiating the mixture with ultraviolet rays, application may be adjusted by applying the syrup to a heavy peeling release film and laminating a light peeling release film after a second photoinitiator and a third photoinitiator are mixed with the syrup, the protective film may be manufactured through a process of forming a film by irradiating the syrup applied between the two release films with ultraviolet rays, a smoothness of the thin film may allow no flow marks to be externally generated as compared to a T-die manufacturing method, and thus visual distortion may not occur.

The base film layer (100) may have a thickness in a range of 100 μm to 300 μm, a tensile strength in a range of 5 MPa to 40 MPa, an elongation in a range of 100% to 700%, a Young's modulus in a range of 10 MPa to 200 MPa, and a Tg (glass transition temperature) in a range of −40° C. to 10° C.

The surface-coated layer (200) may have a thickness in a range of 10 μm to 40 μm and a Young's modulus in a range of 10 MPa to 100 MPa.

The protective film layer (300) may be formed by applying a silicone adhesive having an adhesive force in a range of 1 gf/in to 10 gf/in to one side surface of a transparent polyethylene terephthalate (PET) film having a thickness in a range of 30 μm to 80 μm, then drying the one side surface in a chamber at a temperature in a range of 155° ° C. to 165° C. for one to three minutes, and laminating the PET film having a thickness in a range of 9 μm to 50 μm and formed by applying the silicone adhesive at a thickness in a range of 3 μm to 15 μm therewith.

The release film layer (500) may use a silicone release-treated film on one side of a polyethylene terephthalate (PET) that is not embossed or may be a PET film including silica having a milky white color, a one side thereof being silicone release-treated, and thus may have an average roughness value (Ra value) in a range of 0.2 μm to 1.0 μm.

The protective film may include the base film layer (100), the surface coated layer (200) positioned on the base film layer (100), the protective film layer (300) positioned on the surface coated layer (200), a heat blocking layer (600) positioned under the base film layer (100), a first base layer (700) positioned under the heat blocking layer (600), the adhesive layer (400) positioned under the first base layer (700), and the release film layer (500) positioned under the adhesive layer (400).

The heat blocking layer (600) may include at least one selected from the group consisting of indium gallium oxide, indium tin oxide, aluminum-doped zinc oxide, zinc oxide (ZnO), niobium oxide ($Nb_2O_5$), silver niobium oxide, and a metal oxide.

One side surface of the first base layer (700) may include a metal oxide manufactured by depositing aluminum or sputtering ITO, AZO, Ag, AZO, and ITO that are inorganic metal oxides, and the first base layer (700) may be formed of polyethylene terephthalate (PET) and have a thickness in a range of 9 μm to 12 μm.

The specific details of other embodiments are included in the detailed description.

Advantageous Effects

In an easily constructed stone chip-preventing protective film attachable to the outside of a windshield of a vehicle according to the present invention, the protective film of a windshield of a vehicle, which includes a base film layer formed of a highly elastic film, is configured, and the protective film may be smoothly attached and easily constructed without heat construction according to a shape of the windshield, thereby increasing construction efficiency, and occurrence of stone chips caused by collision with small stones or hard foreign substances may be prevented.

It will be fully understood that embodiments of the technical spirit of the present invention may provide various effects that are not specifically mentioned.

MODES OF THE INVENTION

Advantages and features of the present invention and a method of achieving the advantages and the features will become apparent with reference to embodiments described below in detail. However, the present invention is not limited to the embodiments described herein and may be embodied in other forms. Rather, the embodiments introduced herein are provided so that the disclosure is thorough and complete and the spirit of the present invention can be sufficiently conveyed to those skilled in the art.

Terms used in the present application are used only to describe the specific embodiments and are not intended to limit the present invention. Singular expressions include plural expressions unless clearly otherwise indicated in the context.

Unless otherwise defined, all terms used herein including technical or scientific terms have the same meanings as those commonly understood by those skilled in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly defined herein.

Hereinafter, the embodiments of an easily constructed stone chip-preventing protective film attachable to the outside of a windshield of a vehicle according to the present invention will be described in detail with reference to the accompanying drawings.

Figure 1:
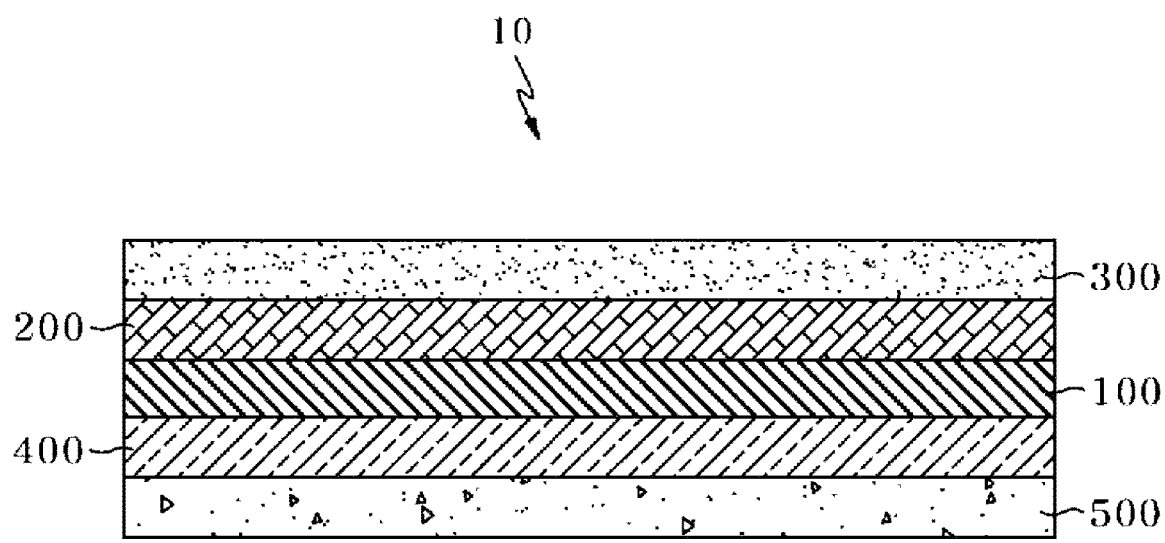
FIG. 1 is a cross-sectional view illustrating a schematic cross section of an easily constructed stone chip-preventing protective film attachable to the outside of a windshield of a vehicle according to an embodiment of the technical spirit of the present invention.

FIG. 1 is a cross-sectional view illustrating a schematic cross section of an easily constructed stone chip-preventing protective film attachable to the outside of a windshield of a vehicle according to an embodiment of the technical spirit of the present invention.

Referring to FIG. 1, an easily constructed stone chip-preventing protective film attachable to the outside of a windshield of a vehicle according to the present invention includes a base film layer 100, a surface coated layer 200 positioned on the base film layer 100, a protective film layer 300 positioned on the surface coated layer 200, an adhesive layer 400 positioned under the base film layer 100, and a release film layer 500 positioned under the adhesive layer 400.

The base film layer 100 including a urethane oligomer, an acrylate-based monomer, a methacrylate-based monomer, and a photoinitiator may be manufactured, and the base film layer 100 may include, for example, 5 to 50 parts by weight of a polyurethane acrylate oligomer, 1 to 30 parts by weight of an acrylic monomer, 30 to 90 parts by weight of an ultraviolet non-reactive resin, and 0.1 to 5 parts by weight of a photoinitiator.

Further, the base film layer 100 may have a thickness in a range of 50 µm to 500 µm, preferably in a range of 100 µm to 300 µm, and may satisfy a tensile strength in a range of 5 MPa to 40 MPa, an elongation of 100% to 700%, a Young's modulus in a range of 10 MPa to 200 MPa, and Tg (glass transition temperature) in a range of −40° C. to 10° C.

Further, the base film layer 100 may be manufactured using an ultraviolet curing system, and specifically, may be manufactured through the following processes.

That is, in order to manufacture the base film layer 100, a mixture may be prepared by first mixing a urethane oligomer, an acrylate-based monomer, a methacrylate-based monomer, and a first photoinitiator.

In this operation, the base film layer 100 may include 5 to 50 parts by weight of a polyurethane acrylate oligomer, 1 to 30 parts by weight of an acrylic monomer, 30 to 90 parts by weight of an ultraviolet non-reactive resin, and 0.1 to 5 parts by weight of a photoinitiator.

Next, a syrup may be prepared by performing a primary polymerization reaction by irradiating the mixture with ultraviolet rays.

In this operation, the syrup that is subjected to the primary polymerization reaction may have a viscosity in a range of 300 CPS to 2,000 CPS.

Next, after a second photoinitiator and a third photoinitiator are mixed with the syrup, application may be adjusted by applying the mixture to a heavy peeling release film and laminating a light peeling release film.

Next, the base film layer 100 may be manufactured by irradiating the syrup applied between the two release films with ultraviolet rays to form a film.

In the present invention, the base film layer 100 may be formed by irradiating ultraviolet rays. As described above, the base film layer 100 is formed by irradiating ultraviolet rays. Thus, a thin film having a thickness in a range of 50 µm to 300 µm may be formed. Further, the smoothness of the thin film allows no flow marks to be externally generated as compared to a T-die manufacturing method, and thus the smoothness of a visual distortion level is very excellent, construction is simple, and economic feasibility may be achieved.

That is, when the base film layer 100 is formed using the T-die manufacturing method, a shear force is generated on a die surface during extrusion due to high viscosity, flow marks of the melted liquid are generated, and a bending phenomenon occurs. Thus, when the base film layer 100 is used as a protective film 10 for a windshield of a vehicle, visual distortion may occur due to the bending phenomenon.

Since the surface coated layer 200 is positioned on the base film layer 100 and is attached to the outside of the windshield of the vehicle, the surface coated layer 200 may be a self-healing coating agent that contains a fluorine compound and modified siloxane to lower a surface tension as much as possible so that a windshield wiper operates quietly and smoothly in rainy weather and contains ultraviolet absorbers to block ultraviolet rays introduced into the vehicle.

Further, the surface coated layer 200 may be a highly elastic compound having a thickness in a range of 10 µm to 60 µm, preferably in a range of 10 µm to 40 µm, and a Young's modulus in a range of 10 MPa to 100 MPa.

The surface coated layer 200 may have a pollution preventing function, a water repellent function, and a scratch self-healing function, and specifically, may be manufactured through the following processes.

That is, a self-recovery coating resin of the surface coated layer 200 is a composition solution in which a dihydroxyl polyurethane prepolymer and a polyester prepolymer are mixed in 20 to 60 parts by weight of a polyurethane prepolymer with respect to 100 parts by weight of the polyester prepolymer. A crosslinking agent is a self-heating coating agent containing 20 to 100 parts by weight of at least one isocyanate selected from the group consisting of hexamethylene diisocyanate (HDI), methylenebis(4-cyclohexylisocyanate) (H12MDI), polymeric isocyanates, or a trimer (isocyanurate) and a poly(MDI) of poly(diisocyanate), HDI, and IDPI. The self-heating coating agent having a pollution preventing function and including 5 to 20 parts by weight of an ultraviolet absorber, 0.5 to 5 parts by weight of a fluorine compound, and 0.3 to 6 parts by weight of modified siloxane is prepared. When a heavy peeling release film on an opposite surface to the adhesive layer 400 formed on one side surface of the base film layer 100 is removed using a peeling device and a self-recovery layer is coated using a micro gravure coater, the coating agent is dried on the coating layer at a viscosity in a range of 10 CPS to 500 CPS, the coating layer is then coated at a thickness in a range of 10 µm to 40 µm and dried and cured at a temperature in a range of 60° C. to 150° C. for one to three minutes and aged at a temperature in a range of 40° ° C. to 50° C. for 40 hours to 80 hours. Thus, the surface coated layer 200 may be manufactured.

The protective film layer 300 may be formed on the surface coated layer 200 and formed to protect the surface coated layer 200 from an external impact until the protective film layer 300 is removed by a constructor. For example, the protective film layer 300 may be formed of a polyethylene terephthalate (PET) film coated with a silicone adhesive.

That is, the protective film layer 300 is a film layer that is removed from the windshield of the vehicle after construction. After a silicone adhesive having an adhesive force in a range of 1 gf/in to 10 gf/in is applied to one side surface of the transparent PET film having a thickness in a range of 30 μm to 80 μm, the one side surface is dried in a chamber at a temperature in a range of 155° ° C. to 165° C. for one to three minutes, the PET film having a thickness in a range of 9 μm to 50 μm and formed by applying the silicone adhesive at a thickness in a range of 3 μm to 15 μm is laminated therewith, and thus the protective film layer 300 may be stored.

The adhesive layer 400 may be positioned under the base film layer 100 and may adhere to the windshield of the vehicle during construction. For F example, an acrylic adhesive is used for the adhesive layer 400, the acrylic adhesive is a high molecular weight adhesive having a weight average molecular weight (Mw) in a range of 500,000 to 700,000, and when the acrylic adhesive is used, an adherend may not be transferred to or pollute the adhesive.

In detail, the acrylic adhesive may be an acrylic copolymer solution polymerized with 2-hexylethyl acrylate, buhexyacrylate, vinyl acetate, and acrylic acid 2-hydroxyethyl methacrylate, and an adhesive force range of the acrylic adhesive is in a range of 50 gf/in to 1,500 gf/in, preferably 50 gf/in to 500 gf/in.

When the adhesive force range of the acrylic adhesive is less than 50 gf/in, an adhesive force is weak and thus the protective film 10 may be easily separated after attachment, and when the adhesive force range is more than 500 gf/in, the adhesive force is strong, and thus it is difficult to remove the protective film 10 later.

The release film layer 500 may use a silicone release-treated film on one side of a PET that is not embossed, and in order to improve drainage and exhaust performance when the release film is removed and the protective film 10 is constructed on a glass surface, a silicone release treated PET film including silica having an average roughness value (Ra value) of a milky white color in a range of 0.2 μm to 1.0 μm may be used. Further, when the protective film 10 is constructed on vehicle glass, an embossed layer having a thickness in a range of 0.2 μm to 1.0 μm serves as drainage and exhaust, and when the protective film 10 is attached to the vehicle glass, in order to ensure that an adhesive surface of the film does not adhere and is accurately attached in place, water containing a small amount of surfactant is sprayed on the glass surface and the adhesive surface of the film, the protective film 10 is attached to the glass, and then water between the glass and the adhesive surface is removed through pushing of a tool called a squeeze.

In this case, as described above, a space is formed between a continuous embossed quadrangular pattern and a continuous embossed diamond pattern to serve as a drain to easily remove water and dramatically shorten a construction time without air bubbles, thereby maximizing construction efficiency.

That is, the release film layer 500 is formed in an embossing shape on an adhesive surface having irregular unevennesses and serves as a drain when the construction is performed by spraying water with a sprayer or a drain through which air escapes. Thus, the construction is easily performed without air bubbles, thereby dramatically shortening a construction time and maximizing construction efficiency.

When the release film layer 500 is a release film that is not embossed, an average thickness of a silicone release layer on one side surface of the PET having a thickness of 75 μm is in a range of 0.1 μm to 0.3 μm, and a release force when the release film layer 500 is separated from the adhesive layer 400 is in a range of 1 gf/in to 20 gf/in.

Further, in the release film layer 500, the thickness of the milky white irregularly embossed PET containing silica may be in a range of 38 μm to 100 μm, a silicone release layer on one side surface thereof may be applied at a thickness in a range of 0.1 μm to 0.3 μm, and a release force when the release film layer 500 is separated from the adhesive layer 400 may be 1 gf/in to 20 gf/in.

Figure 2:
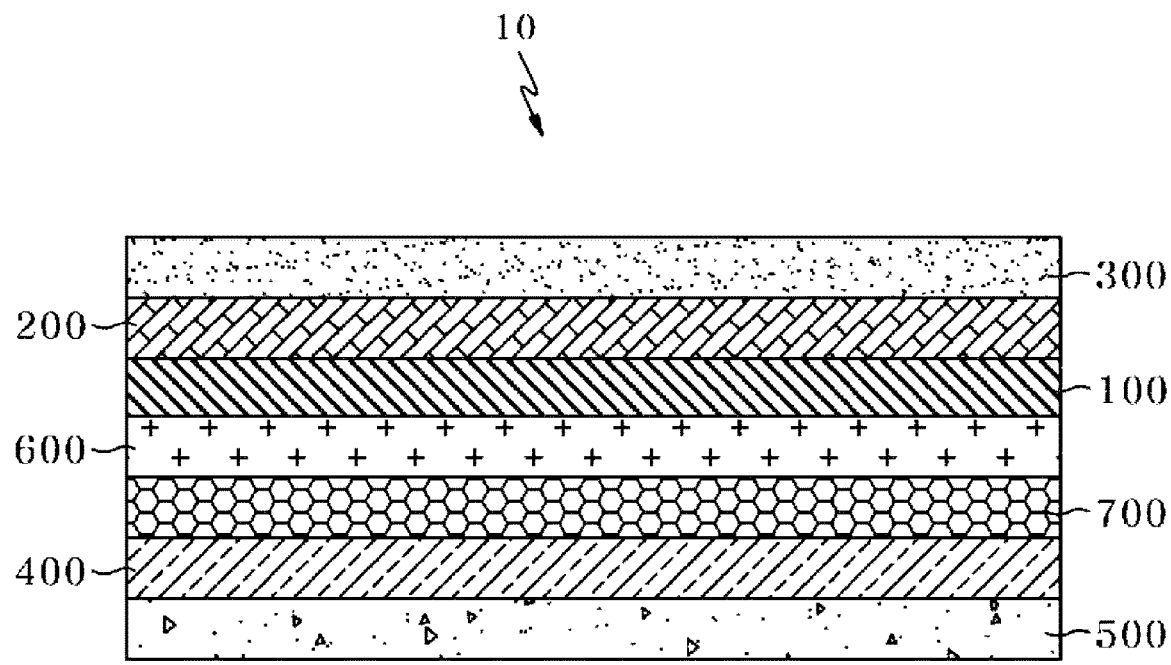
FIG. 2 is a cross-sectional view illustrating a schematic cross section of an easily constructed stone chip-preventing protective film attachable to the outside of a windshield of a vehicle according to another embodiment of the technical spirit of the present invention.

FIG. 2 is a cross-sectional view illustrating a schematic cross section of an easily constructed stone chip-preventing protective film attachable to the outside of a windshield of a vehicle according to another embodiment of the technical spirit of the present invention.

Referring to FIG. 2, an easily constructed stone chip-preventing protective film 10 attachable to the outside of a windshield of a vehicle according to another embodiment of the technical spirit of the present invention includes the base film layer 100, the surface coated layer 200 positioned on the base film layer 100, the protective film layer 300 positioned on the surface coated layer 200, a heat blocking layer 600 positioned under the base film layer 100, a first base layer 700 positioned under the heat blocking layer 600, the adhesive layer 400 positioned under the first base layer 700, and the release film layer 500 positioned under the adhesive layer 400.

Meanwhile, in the easily constructed stone chip-preventing protective film attachable to the outside of a windshield of a vehicle according to another embodiment of the technical spirit of the present invention, the configuration of the base film layer 100, the surface coated layer 200, the protective film layer 300, the adhesive layer 400, and the release film layer 500 is the same as the above-described configuration described in the embodiment of the technical spirit of the present invention. Thus, for convenience of description and clarity of the technical spirit of the present invention, a repeated detailed description thereof will be omitted, and only the configuration of the heat blocking layer 600 and the first base layer 700 that are technical features according to another embodiment of the technical spirit of the present invention will be described in detail.

The heat blocking layer 600 may be positioned under the base film layer 100 and may be included in the stone chip-preventing protective film 10 according to another embodiment of the technical spirit of the present invention to perform a heat blocking function.

The heat blocking layer 600 may include at least one selected from the group consisting of indium gallium oxide, indium tin oxide, aluminum-doped zinc oxide, zinc oxide (ZnO), niobium oxide ($Nb_2O_5$), silver niobium oxide, and a metal oxide. The metal oxide may include at least one selected from the group consisting of a tin oxide (SnO, $SnO_2$), zinc oxide, and a tungsten bronze compound. A dye may be added.

The first base layer 700 may be positioned under the heat blocking layer 600, and one side surface of the first base layer 700 may include a metal oxide produced by depositing aluminum or through a sputtering process using an inorganic metal oxide such as ITO, AZO, Ag, AZO, or ITO.

The first base layer 700 may be formed of a PET film and have a thickness in a range of 9 μm to 12 μm. When the thickness of the first base layer 700 is less than 9 μm, wrinkles may occur at high temperatures during a deposition process and a sputtering process, and when the thickness of the first base layer 700 is more than 12 μm, there is the inconvenience of using a heat gun to perform heating and forming when the windshield of the vehicle is constructed, which reduces construction efficiency.

Hereinabove, the embodiments of the present invention have been described. However, those skilled in the art to which the present invention pertains can understand that the present invention can be implemented in other specific forms without changing the technical spirit or essential features thereof. Therefore, it should be understood that the embodiments described above are illustrative but not limiting in all aspects.

The invention claimed is:

1. An easily constructed stone chip-preventing protective film attachable to an outside of a windshield of a vehicle, the protective film comprising:
   a base film layer (100);
   a surface coated layer (200) positioned on the base film layer (100);
   a protective film layer (300) positioned on the surface coated layer (200);
   an adhesive layer (400) positioned under the base film layer (100); and
   a release film layer (500) positioned under the adhesive layer (400),
   wherein the surface-coated layer (200) has a thickness in a range of 10 μm to 40 μm and a Young's modulus in a range of 10 MPa to 100 MPa
   wherein the base film layer (100) has a thickness in a range of 100 μm to 300 μm, a tensile strength in a range of 5 MPa to 40 MPa, an elongation in a range of 100% to 700%, a Young's modulus in a range of 10 MPa to 200 MPa, and a Tg (glass transition temperature) in a range of −40° ° C. to 10° C.

2. The protective film of claim 1, wherein, in the base film layer (100), a mixture is manufactured by mixing 5 to 50 parts by weight of a polyurethane acrylate oligomer, 1 to 30 parts by weight of an acrylic monomer, 30 to 90 parts by weight of an ultraviolet non-reactive resin, and 0.1 to 5 parts by weight of a photoinitiator, a syrup having a viscosity in a range of 300 CPS to 2,000 CPS is prepared by performing a primary polymerization reaction by irradiating the syrup with ultraviolet rays, application is adjusted by applying the mixture to a heavy peeling release film and laminating a light peeling release film after a second photoinitiator and a third photoinitiator are mixed with the syrup, the protective film is manufactured through a process of forming a film by irradiating the syrup applied between the two release films with ultraviolet rays, a smoothness of the thin film allows no flow marks to be externally generated as compared to a T-die manufacturing method, and thus visual distortion does not occur.

3. The protective film of claim 1, wherein the protective film layer (300) is formed by applying a silicone adhesive having an adhesive force in a range of 1 gf/in to 10 gf/in to one side surface of a transparent polyethylene terephthalate (PET) film having a thickness in a range of 30 μm to 80 μm, then drying the one side surface in a chamber at a temperature in a range of 155° C. to 165° C. for one to three minutes, and laminating the PET film having a thickness in a range of 9 μm to 50 μm and formed by applying the silicone adhesive at a thickness in a range of 3 μm to 15 μm therewith.

4. The protective film of claim 1, wherein the release film layer (500) uses a silicone release-treated film on one side of a polyethylene terephthalate (PET) that is not embossed or is a PET film including silica having a milky white color, a one side thereof being silicone release-treated, and thus has an average roughness value (Ra value) in a range of 0.2 μm to 1.0 μm.

5. The protective film of claim 1, comprising:
   the base film layer (100);
   the surface coated layer (200) positioned on the base film layer (100);
   the protective film layer (300) positioned on the surface coated layer (200);
   a heat blocking layer (600) positioned under the base film layer (100);
   a first base layer (700) positioned under the heat blocking layer (600);
   the adhesive layer (400) positioned under the first base layer (700); and
   the release film layer (500) positioned under the adhesive layer (400).

6. The protective film of claim 5, wherein the heat blocking layer (600) includes at least one selected from the group consisting of indium gallium oxide, indium tin oxide, aluminum-doped zinc oxide, zinc oxide (ZnO), niobium oxide ($Nb_2O_5$), silver niobium oxide, and a metal oxide.

7. The protective film of claim 6, wherein one side surface of the first base layer (700) includes a metal oxide manufactured by depositing aluminum or sputtering ITO, AZO, Ag, AZO, and ITO that are inorganic metal oxides, and the first base layer (700) is formed of polyethylene terephthalate (PET) and has a thickness in a range of 9 μm to 12 μm.

* * * * *